United States Patent
Chu et al.

(10) Patent No.: US 6,986,598 B2
(45) Date of Patent: Jan. 17, 2006

(54) BACKLIGHT MODULE FOR A DOUBLE-SIDED LCD DEVICE

(76) Inventors: Yao-Wen Chu, No. 8-3, Lane 1188, Yung-An Rd., Tao-Yuan City, Tao-Yuan Hsien (TW); Pang-Lun Yang, 3F-2, No. 2, Lane 71, Szu-Wei Rd., Wu-Chi Jen, Tai-Chung Hsien (TW)

(*) Notice: Subject to any disclaimer, the term of this patent is extended or adjusted under 35 U.S.C. 154(b) by 0 days.

(21) Appl. No.: 10/249,747

(22) Filed: May 5, 2003

(65) Prior Publication Data

US 2004/0223343 A1 Nov. 11, 2004

(51) Int. Cl.
*G02F 1/1335* (2006.01)

(52) U.S. Cl. .................. 362/561; 362/27; 362/607; 349/65; 345/1.1

(58) Field of Classification Search .......... 362/26, 362/27, 31, 561, 245, 607; 349/64, 65, 68, 349/69, 70, 114, 112; 345/1.1, 3, 4
See application file for complete search history.

(56) References Cited

U.S. PATENT DOCUMENTS

| | | | | |
|---|---|---|---|---|
| 5,018,290 A | * | 5/1991 | Kozek et al. .................. 40/570 |
| 5,143,433 A | * | 9/1992 | Farrell ........................... 362/29 |
| 5,329,388 A | * | 7/1994 | Yoshimizu ..................... 349/80 |
| 5,453,855 A | * | 9/1995 | Nakamura et al. ............. 349/58 |
| 5,844,773 A | * | 12/1998 | Malhi ........................... 361/681 |
| 5,956,107 A | * | 9/1999 | Hashimoto et al. ............ 349/64 |
| 5,963,287 A | * | 10/1999 | Asada et al. ................. 349/150 |
| 6,026,602 A | * | 2/2000 | Grondal et al. ............... 40/570 |
| 6,354,709 B1 | * | 3/2002 | Campbell et al. .............. 362/31 |
| 6,502,945 B2 | * | 1/2003 | Kim et al. ..................... 362/27 |
| 6,847,427 B2 | * | 1/2005 | Yamauchi .................... 349/113 |
| 6,897,914 B2 | * | 5/2005 | Yoshida ........................ 349/65 |
| 2003/0063456 A1 | * | 4/2003 | Katahira ....................... 362/27 |
| 2004/0008506 A1 | * | 1/2004 | Son .............................. 362/31 |

* cited by examiner

*Primary Examiner*—John Anthony Ward (74) *Attorney, Agent, or Firm*—Winston Hsu (57) ABSTRACT

A liquid crystal display (LCD) device includes a backlight module for providing backlight to the LCD device; a first liquid crystal panel disposed on a top surface of the backlight module for displaying images; and a second liquid crystal panel disposed on a bottom surface of the backlight module for displaying images. The LCD device also includes at least one driver circuit board disposed on at least one side of the backlight module for driving selected cells within the first and second liquid crystal panels in order to display a same image simultaneously.

20 Claims, 11 Drawing Sheets

BACKLIGHT MODULE FOR A DOUBLE-SIDED LCD DEVICE

BACKGROUND OF INVENTION

1. Field of the Invention

The present invention relates to a backlight module used in a liquid crystal display (LCD) device, and more specifically, to a double-sided LCD device that uses a single backlight module.

2. Description of the Prior Art

Figure 1:
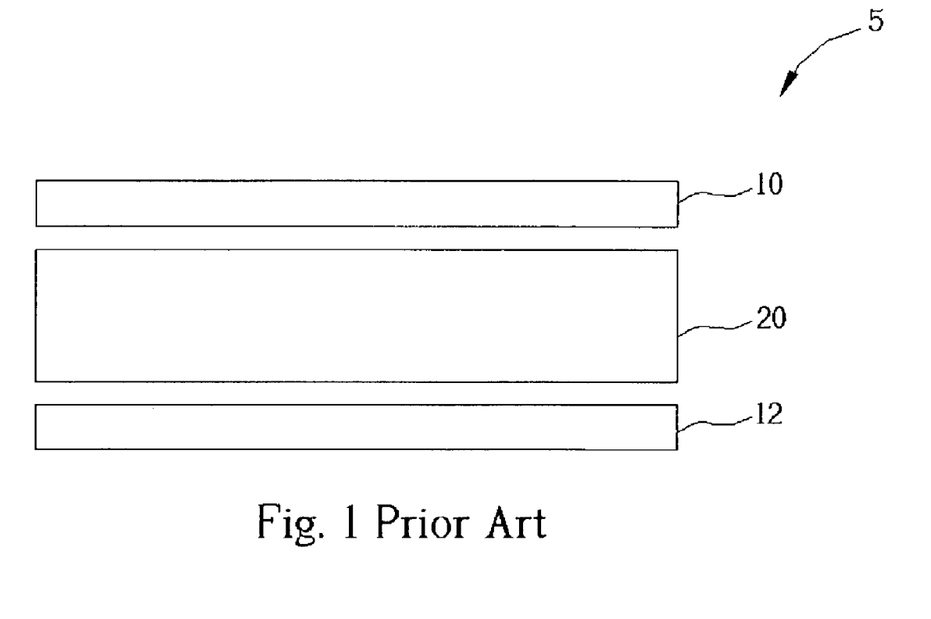
FIG. 1 is a cross-sectional view of a liquid crystal display (LCD) device according to the prior art.

Please refer to FIG. 1. FIG. 1 is a cross-sectional view of a liquid crystal display (LCD) device 5 according to the prior art. The LCD device 5 includes a liquid crystal panel 10, which has two substrates and a liquid crystal inserted therebetween, and a backlight module 20 disposed under the liquid crystal panel 10 for providing backlight to the liquid crystal panel 10. A driver circuit board 12 is usually disposed below the backlight module 20 for controlling individual cells within the liquid crystal panel 10. The backlight module 20 is arranged to distribute light from a light source uniformly over the surface of the liquid crystal panel 10. The backlight module 20 can be broken down into categories, including direct type and edge light type.

Figure 2:
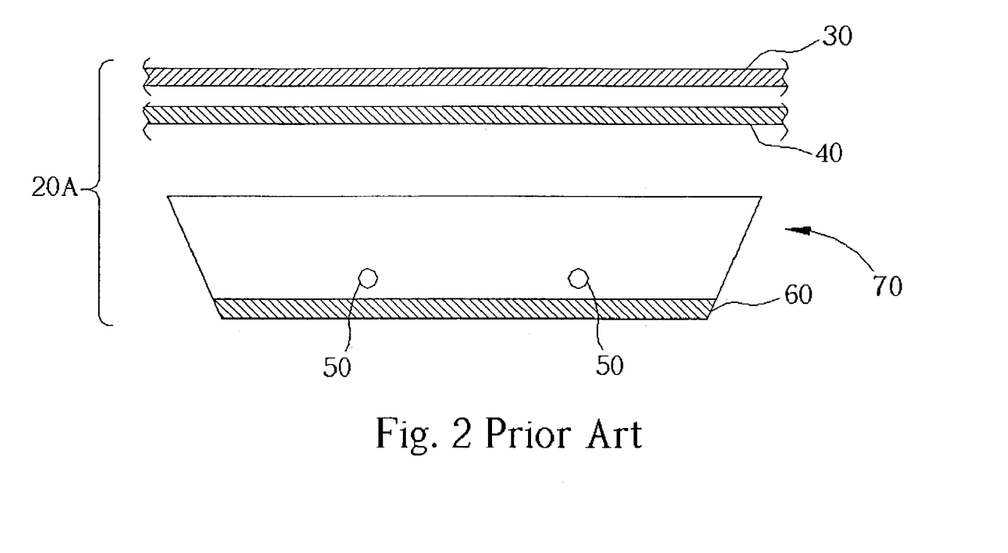
FIG. 2 is a direct type backlight module according to the prior art.

Please refer to FIG. 2. FIG. 2 is a direct type backlight module 20A according to the prior art. The direct type backlight module 20A includes a housing 70 with a reflecting plate 60 disposed at the bottom of the housing 70. A plurality of lamps 50, such as a fluorescence cathode tubes, are disposed at the bottom portion of the housing 70 above the reflecting plate 60 for providing backlight, and the reflectingplate 60 reflects light from the lamps 50 upwards. A diffuser plate 40 is disposed in the housing 70 for diffusing light from the lamps 50, and a prism film 30 is disposed on the diffuser plate 40 for improving luminance of the direct type backlight module 20A.

Figure 3:
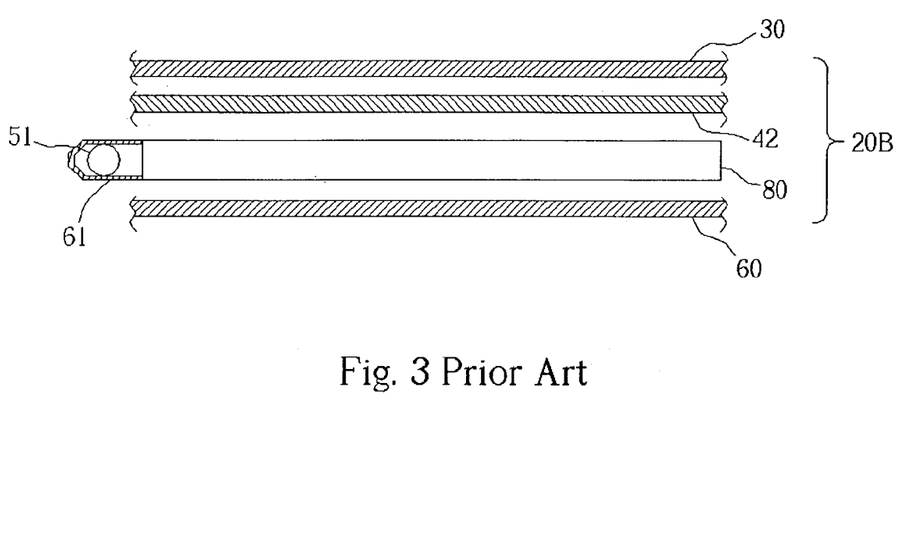
FIG. 3 is an edge light type backlight module according to the prior art.

Please refer to FIG. 3. FIG. 3 is an edge light type backlight module 20B according to the prior art. The edge light type backlight module 20B includes a light guide plate 80 for guiding light through the light guide plate 80 and a lamp 51 disposed on at least one edge of the light guide plate 80 for providing light to the light guide plate 80. A U-type reflector 61 surrounds the lamp 51 for directing light emitted from the lamp 51 towards the light guide plate 80. As with the direct type backlight module 20A, the edge light type backlight module 20B also contains the reflecting plate 60 for reflecting light upwards, a diffusing film 42 disposed on the light guide plate 80 for diffusing light from the light guide plate 80, and the prism film 30 disposed on the diffusing film 42 for improving luminance of the edge light type backlight module 20B.

Both the direct type backlight module 20A and the edge light type backlight module 20B can be used in the LCD device 5, which is a single-sided device. However, because the reflecting plate 60 does not allow light to pass through a bottom side of the backlight modules 20A and 20B, the backlight modules 20A 20B cannot be used in a double-sided LCD device.

SUMMARY OF INVENTION

It is therefore a primary objective of the claimed invention to provide a backlight module for use in a liquid crystal display (LCD) device in order to solve the above-mentioned problems.

According to the claimed invention, a liquid crystal display (LCD) device includes a backlight module for providing backlight to the LCD device; a first liquid crystal panel disposed on a top surface of the backlight module for displaying images; and a second liquid crystal panel disposed on a bottom surface of the backlight module for displaying images. The LCD device further comprises at least one driver circuit board disposed on at least one side of the backlight module for driving selected cells within the first and second liquid crystal panels in order to display a same image simultaneously.

In one embodiment of the invention, the backlight module for use in a liquid crystal display (LCD) device comprises a reflecting plate having a top surface and a bottom surface for reflecting light shining incident on the top and bottom surfaces of the reflecting plate, at least one first lamp disposed on a left side of the reflecting plate and at least one second lamp disposed on a right side of the reflecting plate for providing backlight for the LCD device, a first light guide plate disposed on the top surface of the reflecting plate for guiding light emitted from the first and second lamps, and a second light guide plate disposed on the bottom surface of the reflecting plate for guiding light emitted from the first and second lamps.

In another embodiment of the invention, the backlight module comprises a set of lamps for providing backlight for the LCD device; a first diffuser plate disposed above the first set of lamps for diffusing light emitted from the lamps; and a second diffuser plate disposed below the first set of lamps for diffusing light emitted from the lamps.

The driver circuit of the LCD device is not disposed beneath the first liquid crystal panel and the second liquid crystal panel. In addition the driver circuit board is disposed substantially perpendicular to or parallel with a lateral side of the backlight module.

It is an advantage of the claimed invention that the present invention backlight module can provide backlight in two directions, for using a single backlight to illuminate a double-sided LCD device.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 4:
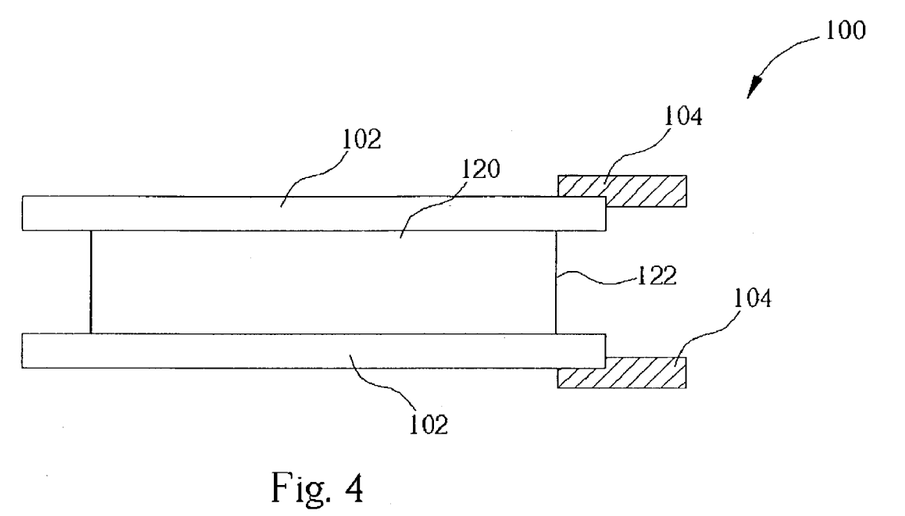
FIG. 4 is a cross-sectional view of an LCD device according to the present invention.

Please refer to FIG. 4. FIG. 4 is a cross-sectional view of an LCD device 100 according to the present invention. The LCD device 100 comprises two liquid crystal panels 102 and a backlight module 120 for providing backlight to the liquid crystal panels 102. The LCD device 100 also contains at least one driver circuit board 104 for controlling individual cells within the liquid crystal panels 102. In FIG. 4, two driver circuit boards 104 are shown, with each driver circuit board 104 being perpendicular to a lateral side 122 of the backlight module 120. The liquid crystal panels 102 are capable of simultaneously displaying identical images or different images according to the wishes of the manufacturer and user.

Figure 5:
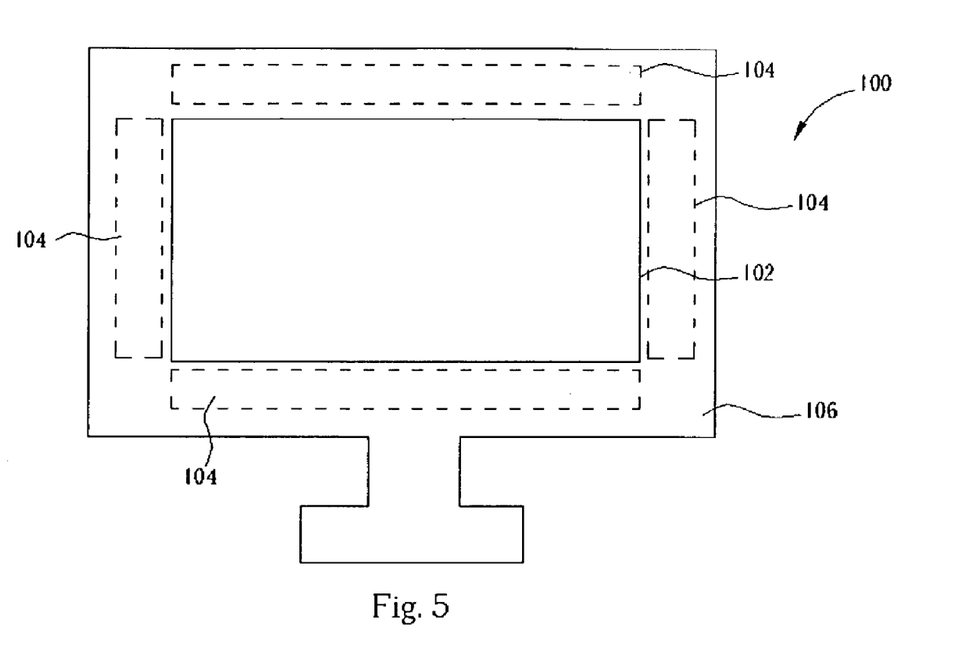
FIG. 5 is a front view of the LCD device shown in FIG. 4.

Please refer to FIG. 5 with reference to FIG. 4. FIG. 5 is a front view of the LCD device 100 shown in FIG. 4. The LCD device 100 contains a housing 106 for holding the liquid crystal panels 102. One of the liquid crystal panels 102 is visible in FIG. 5, with the other liquid crystal panel 102 being disposed directly behind. Since the driver circuit boards 104 are perpendicular to the lateral side 122 of the backlight module 120, the driver circuit boards 104 are shown as being disposed on an outer perimeter of the liquid crystal panels 102. In this case, driver circuit boards 104 are disposed on each side of the liquid crystal panels 102. Please note that it is not required that the driver circuit boards 104 be disposed on all four sides of the liquid crystal panels 102. Two driver circuit boards 104 could also be used, with one controlling rows of cells and the other controlling columns of cells.

Figure 6:
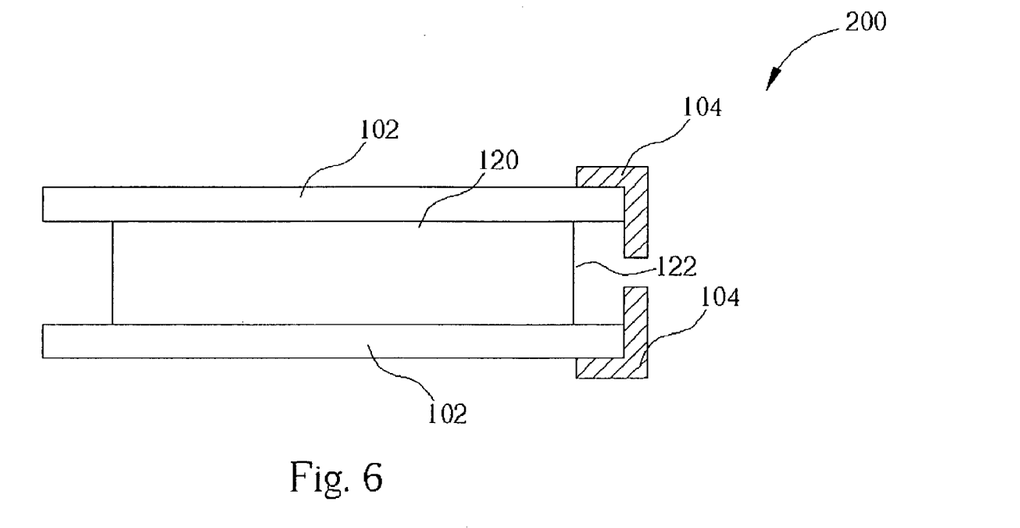
FIG. 6 shows an LCD device having driver circuit boards positioned parallel with a lateral side of a backlight module.

Please refer to FIG. 6. FIG. 6 shows an LCD device 200 having driver circuit boards 104 positioned parallel with the lateral side 122 of the backlight module 120. The LCD device 200 structure shown in FIG. 6 is preferably used when the backlight module 10 is direct type, but be used with either a direct type or an edge light type backlight module. Also, the two driver circuit boards 104 shown in FIG. 6 can instead be combined into a single driver circuit board 104 if desired.

Figure 7:
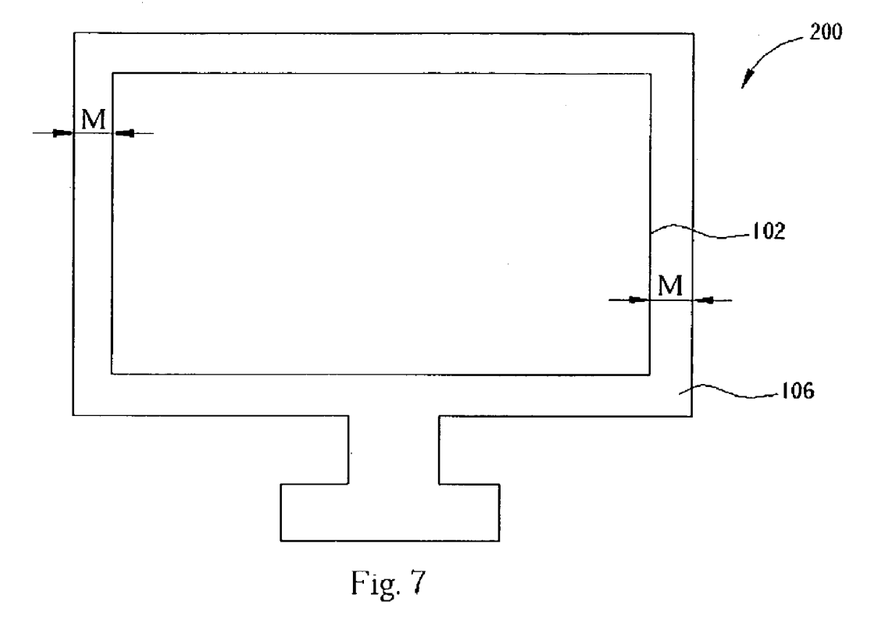
FIG. 7 is a front view of the LCD device shown in FIG. 6.

Please refer to FIG. 7 with reference to FIG. 6. FIG. 7 is a front view of the LCD device 200 shown in FIG. 6. The LCD device 200 contains the housing 106 for holding the liquid crystal panels 102. Since the driver circuit boards 104 are parallel with the lateral side 122 of the backlight module 120 in the LCD device 200, so the margin M of the LCD device 200 can be reduced.

Figure 8:
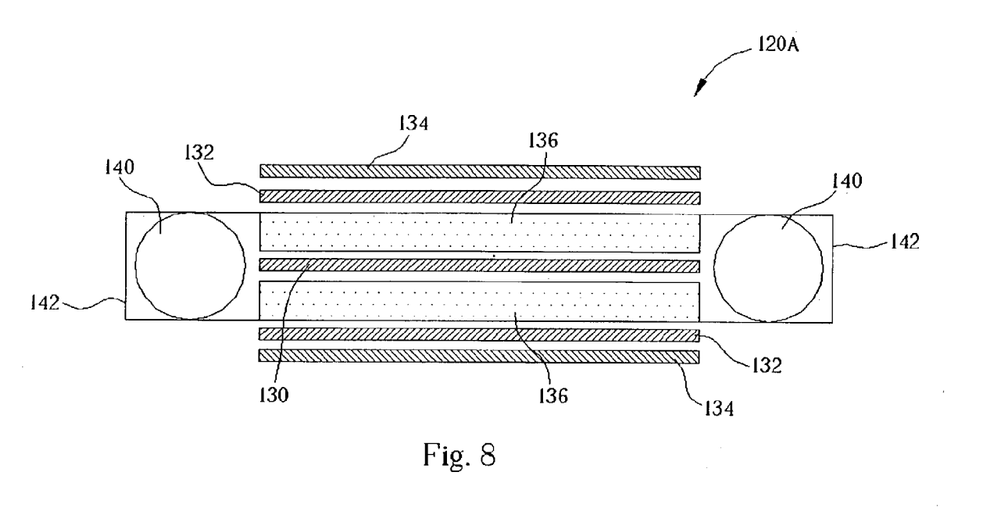
FIG. 8 to FIG. 11 are backlight modules according to the first through fourth embodiments of the present invention.

Please refer to FIG. 8. FIG. 8 is a backlight module 120A according to the first embodiment of the present invention. The backlight module 120A is an edge light type backlight module that can be used in the double-sided LCD device 100. The backlight module 120A contains a reflecting plate 130 for reflecting light towards each of the liquid crystal panels 102. Lamps 140 are used for providing light to light guide plates 136 disposed in the backlight module 120A. The lamps 140 are disposed beside the two light guide plates 136, and the light guide plates 136 distribute the light from the lamps 140 across the backlight module 120A. A U-type reflector 142 surrounds each lamp 140 for directing light from the lamps 140 into the light guide plates 136. Please note that each of the lamps 140 is used to emit light into both of the light guide plates 136. The backlight module 120A includes diffusing films 132 disposed on the light guide plates 136 for diffusing light from the light guide plates 136. Additionally, prism films 134 are disposed on the diffusing films 132 for improving luminance of the backlight module 120A. As shown in FIG. 8, the reflecting plate 130 is substantially parallel with the light guide plates 136.

Figure 9:
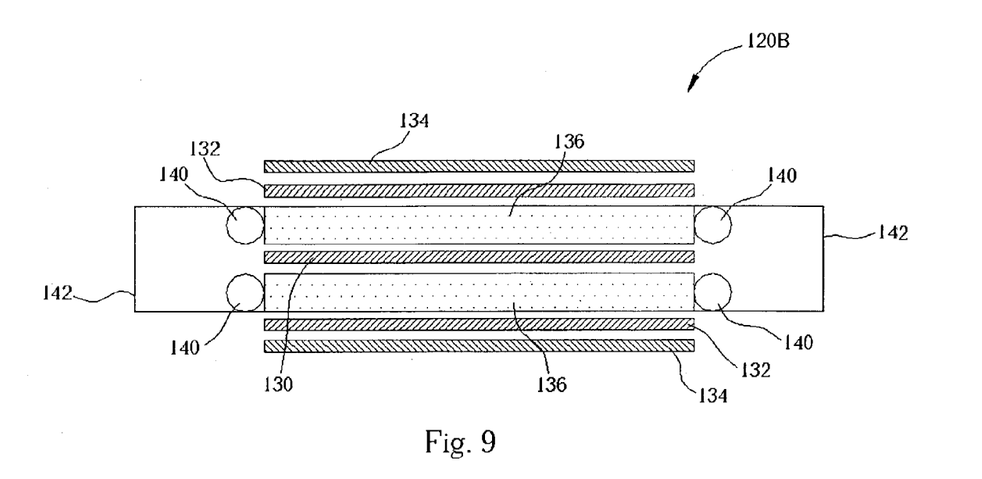

Please refer to FIG. 9. FIG. 9 is a backlight module 120B according to the second embodiment of the present invention. The backlight module 120B is another edge light type backlight module that can be used in the double-sided LCD device 100. The main difference between the backlight module 120B and the backlight module 120A of FIG. 8 is the backlight module 120B contains lamps 140 corresponding to each of the light guide plates 136 instead of having each lamp 140 emit light to both light guide plates 136. By placing lamps 140 directly beside each light guide plate 136, light emitted from the lamps 140 has a direct path to the light guide plates 136.

Figure 10:
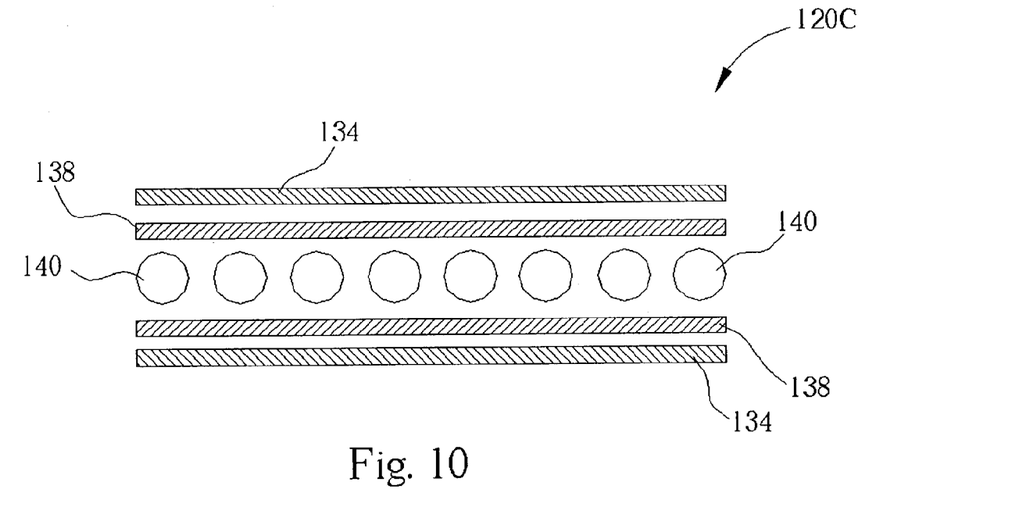

Please refer to FIG. 10. FIG. 10 is a backlight module 120C according to the third embodiment of the present invention. The backlight module 120C is a direct type backlight module that can be used in the double-sided LCD device 100. The backlight module 120C contains a plurality of lamps 140 for emitting light to both of the liquid crystal panels 102. Disposed in the backlight module 120C on either side of the lamps 140 are diffuser plates 138 for diffusing light from the lamps 140. In addition, prism films 134 are disposed on the diffuser plates 138 for improving luminance of the backlight module 120C.

Figure 11:
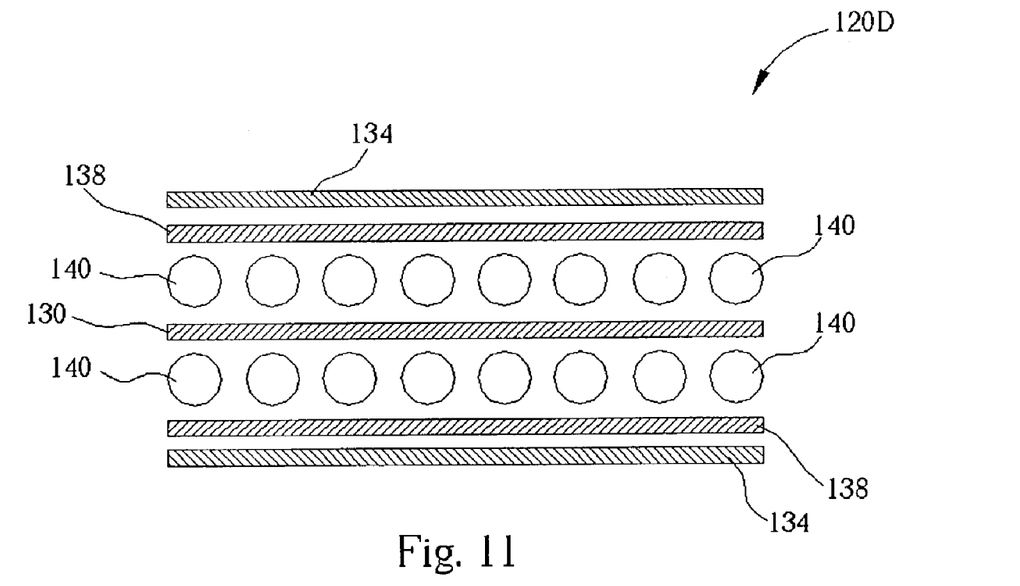

Please refer to FIG. 11. FIG. 11 is a backlight module 120D according to the fourth embodiment of the present invention. The backlight module 120D is another direct type backlight module that can be used in the double-sided LCD device 100. The main difference between the backlight module 120D and the backlight module 120C of FIG. 10 is the backlight module 120D contains two sets of lamps 140, with one set of lamps 140 being disposed on either side of a reflecting plate 130. As shown in FIG. 11, the reflecting plate 130 is substantially parallel with the two sets of lamps 140. The reflecting plate 130 reflects light from each set of lamps 140, and does not allow light to pass through the reflecting plate 130.

In summary, each of the backlight modules 120A–120D shown in FIG. 8 to FIG. 11 can be used as the backlight module 120 for the LCD device 100 shown in FIG. 4. The backlight module 120 can provide light to each of the liquid crystal panels 102, so that the double-sided LCD device 100 can be built using a single backlight module 120. Using a single backlight module 120 reduces the cost and the size of double-sided LCD devices as compared to double-sided LCD devices that use two backlight modules.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A backlight module for use in a liquid crystal display (LCD) device, the backlight module comprising:
    a reflecting plate having a top surface and a bottom surface for reflecting light shining incident on the top and bottom surfaces of the reflecting plate;
    a first light guide plate disposed above the reflecting plate;
    a second light guide plate disposed below the reflecting plate; and
    two first lamps disposed on the left side of the reflecting plate and two second lamps disposed on the right side of the reflecting plate, wherein one first lamp and one second lamp are disposed beside the first light guide plate and one first lamp and one second lamp are disposed beside the second light guide plate.

2. The backlight module of claim 1 further comprising first and second diffusing films respectively disposed on the first and second light guide plates for diffusing light emitted through the first and second light guide plates.

3. The backlight module of claim 2 further comprising first and second prism films respectively disposed on the first and second diffusing films for improving luminance of the backlight module.

4. A backlight module for use in a liquid crystal display (LCD) device, the backlight module comprising:
   a first set of lamps for providing backlight for the LCD device;
   a first diffuser plate disposed above the first set of lamps for diffusing light emitted from the first set of lamps;
   a second set of lamps disposed below the first set of lamps for providing backlight for the LCD device;
   a second diffuser plate disposed below the second set of lamps for diffusing light emitted from the second set of lamps; and
   a reflecting plate disposed between the first and second sets of lamps for reflecting light from the first and second sets of lamps,
   wherein the first and second sets of lamps are parallel with the first and second diffuser plates.

5. The backlight module of claim 4 wherein the reflecting plate is substantially parallel with the first and second sets of lamps.

6. A liquid crystal display (LCD) device comprising:
   a backlight module for providing backlight to the LCD device, the backlight module comprising:
      a reflecting plate having a top surface and a bottom surface for reflecting light shining incident on the top and bottom surfaces of the reflecting plate;
      at least one first lamp disposed on a left side of the reflecting plate and at least one second lamp disposed on a right side of the reflecting plate for providing back light for the LCD device;
      a first light guide plate disposed above the reflecting plate for guiding light emitted from the first and second lamps; and
      a second light guide plate disposed below the reflecting plate for guiding light emitted from the first and second lamps;
   a first liquid crystal panel disposed on a top surface of the backlight module for displaying images;
   a second liquid crystal panel disposed on a bottom surface of the backlight module for displaying images; and
   at least one driver circuit board disposed on at least one side of the backlight module for driving selected cells within the first and second liquid crystal panels in order to display a same image simultaneously.

7. The LCD device of claim 6 wherein the driver circuit board is not disposed beneath the first liquid crystal panel and the second liquid crystal panel.

8. The LCD device of claim 6 wherein the driver circuit board is disposed substantially perpendicular to a lateral side of the backlight module.

9. The LCD device of claim 6 wherein the driver circuit board is disposed substantially parallel with a lateral side of the backlight module.

10. The LCD device of claim 6 wherein the backlight module further comprises two first lamps disposed on the left side of the reflecting plate and two second lamps disposed on the right side of the reflecting plate, wherein one first lamp and one second lamp are disposed beside the first light guide plate and one first lamp and one second lamp are disposed beside the second light guide plate.

11. The LCD device of claim 6 wherein the backlight module further comprises first and second diffusing films respectively disposed on the first and second light guide plates for diffusing light emitted through the first and second light guide plates.

12. The LCD device of claim 11 wherein the backlight module further comprises first and second prism films respectively disposed on the first and second diffusing films for improving luminance of the backlight module.

13. The LCD device of claim 6 wherein the reflecting plate is substantially parallel with the first and second light guide plates.

14. A backlight module for use in a liquid crystal display (LCD) device, the backlight module comprising:
   a reflecting plate having a top surface and a bottom surface for reflecting light shining incident on the top and bottom surfaces of the reflecting plate;
   at least one first lamp disposed on a side of the reflecting plate for providing backlight for the LCD device;
   a first light guide plate disposed above the reflecting plate for guiding light emitted from the first lamp; and
   a second light guide plate disposed below the reflecting plate for guiding light emitted from the first lamp,
   wherein the reflecting plate is substantially parallel with the first and second light guide plates.

15. A backlight module for use in a liquid crystal display (LCD) device, the backlight module comprising:
   a reflecting plate having a top surface and a bottom surface for reflecting light shining incident on the top and bottom surfaces of the reflecting plate;
   at least one first lamp disposed on a left side of the reflecting plate and at least one second lamp disposed on a right side of the reflecting plate for providing backlight for the LCD device;
   a first light guide plate disposed above the reflecting plate for guiding light emitted from the first and second lamps; and
   a second light guide plate disposed below the reflecting plate for guiding light emitted from the first and second lamps,
   wherein the reflecting plate is substantially parallel with the first and second light guide plates.

16. A liquid crystal display (LCD) device comprising:
   a backlight module for providing backlight to the LCD device, the backlight module comprising:
      a first set of lamps for providing backlight for the LCD device;
      a first diffuser plate disposed above the first set of lamps for diffusing light emitted from the lamps; and
      a second diffuser plate disposed below the first set of lamps for diffusing light emitted from the lamps;
   a first liquid crystal panel disposed on a top surface of the backlight module for displaying images;
   a second liquid crystal panel disposed on a bottom surface of the backlight module for displaying images; and
   at least one driver circuit board disposed on at least one side of the backlight module for driving selected cells within the first and second liquid crystal panels in order to display a same image simultaneously.

17. The LCD device of claim 16 wherein the backlight module further comprises a second set of lamps disposed between the first set of lamps and the second diffuser plate for providing backlight for the LCD device.

18. The LCD device of claim 17 wherein the backlight module further comprises a reflecting plate disposed between the first and second sets of lamps for reflecting light from the first and second sets of lamps.

19. The LCD device of claim 18 wherein the reflecting plate is substantially parallel with the first and second sets of lamps.

20. The LCD device of claim 16 wherein the backlight module further comprises first and second prism films respectively disposed on the first and second diffuser plates for improving luminance of the backlight module.

* * * * *

UNITED STATES PATENT AND TRADEMARK OFFICE
CERTIFICATE OF CORRECTION

PATENT NO.    : 6,986,598 B2
DATED         : January 17, 2006
INVENTOR(S)   : Chu et al.

It is certified that error appears in the above-identified patent and that said Letters Patent is hereby corrected as shown below:

<u>Title page,</u>
Item [73], insert:
-- BenQ Corporation, Tao-Yuan (TW) --.

Signed and Sealed this

Eighteenth Day of April, 2006

JON W. DUDAS
*Director of the United States Patent and Trademark Office*